(12) United States Patent
McGeever, Jr.

(10) Patent No.: US 6,807,127 B2
(45) Date of Patent: Oct. 19, 2004

(54) NAVIGATIONAL DEVICE FOR AN UNDERWATER DIVER

(75) Inventor: John F. McGeever, Jr., Long Beach, NY (US) 11561-1126

(73) Assignee: John F. McGeever, Jr., 1117 Oceanfront St., NY (US)

( * ) Notice: Subject to any disclaimer, the term of this patent is extended or adjusted under 35 U.S.C. 154(b) by 0 days.

(21) Appl. No.: 09/683,102

(22) Filed: Nov. 19, 2001

(65) Prior Publication Data

US 2004/0022129 A1 Feb. 5, 2004

(51) Int. Cl.[7] .................................................. G01S 5/14
(52) U.S. Cl. .................. 367/128; 367/131; 367/907
(58) Field of Search .............................. 367/128, 131, 367/907; 342/357.06, 357.14

(56) References Cited

U.S. PATENT DOCUMENTS

| | | | |
|---|---|---|---|
| 3,907,236 A | * | 9/1975 | Sims, Jr. .................. 242/404.1 |
| 3,944,967 A | | 3/1976 | Acks et al. |
| 3,986,161 A | | 10/1976 | MacKellar |
| 5,077,703 A | | 12/1991 | Strauss |
| 5,187,871 A | | 2/1993 | McDermott |
| 5,406,294 A | * | 4/1995 | Silvey et al. .................. 441/1 |
| 5,514,843 A | * | 5/1996 | Wilfong et al. ............. 200/5 R |
| 5,570,323 A | | 10/1996 | Prichard et al. |
| 5,655,308 A | | 8/1997 | McDermott |
| 5,659,520 A | | 8/1997 | Watson et al. |
| 5,666,326 A | | 9/1997 | Holzschuh |
| 5,669,148 A | | 9/1997 | McDermott |
| 5,708,626 A | | 1/1998 | Hrubes |
| 5,749,150 A | | 5/1998 | McDermott |
| 5,784,339 A | | 7/1998 | Woodsum et al. |
| 5,831,574 A | | 11/1998 | Krasner |
| 5,913,078 A | | 6/1999 | Kimura et al. |
| 5,944,768 A | | 8/1999 | Ito et al. |
| 5,952,958 A | | 9/1999 | Speasl et al. |
| 5,956,291 A | | 9/1999 | Nehemiah et al. |
| 6,029,515 A | | 2/2000 | Lähteenmäki et al. |
| 6,054,950 A | | 4/2000 | Fontana |
| 6,097,670 A | | 8/2000 | Johnson |
| 6,130,642 A | | 10/2000 | Woodall, Jr. et al. |
| 2002/0140599 A1 | * | 10/2002 | King ...................... 342/357.06 |

FOREIGN PATENT DOCUMENTS

WO      WO-0155747 A1 * 8/2001 ............ G01V/1/38

OTHER PUBLICATIONS

ACCU-DIVE webpage (www.longbeachdive.com/accudive-detail.htm); copyright 2003, 8 pages.*

U.S. patent application Ser. No. 60/280252, King, filed Mar. 2001.*

Navionics ECharts, www.lowrance.com/mapping/Navionics/default.asp.

Ikelite Underwater Systems, www.ikelite.com/web_pages/control_parts.html.

(List continued on next page.)

*Primary Examiner*—Daniel Pihulic (57) ABSTRACT

An apparatus for providing Global Positioning System (GPS) position data to an underwater diver for use in navigation is comprised of a SCUBA Flag/Antenna Float, positioned on the surface of the water, containing a Spring-loaded Cable Reel which is connected via a Signal Umbilical Cable to a GPS Capsule carried by the underwater diver. A GPS Antenna and power supply provide a signal to a GPS Receiver/Display which is encased in the GPS Capsule. The diver views icons displayed on the GPS Receiver to determine his/her current position in relation to previously entered waypoints, or geographical coordinates, such as a wreck, dive boat, or locations of interest plotted by the diver during the dive. The position information displayed by the GPS receiver enables the diver to navigate to and from the various locations or geographical coordinates while submerged.

21 Claims, 9 Drawing Sheets

OTHER PUBLICATIONS

Coaxial Cable Type, www.newmex.com/~ebear/coaxlist.html.
Coaxial Cable Page, www.cdi2.com/build_it/coaxloss.htm.
Otter Box—Watertight, crushproof box to keep your valuables dry, www.otterbox.com/sizes.html.
Custom Cable Assemblies—Cables, www.customcableinc.com/products2.html.
Navionics, "How to Install Your Navionics EChart into your Lowrance Plotter in 2 Easy Steps", www.navionics.com.
Nielsen/Sessions Hardware, www.casehardware.com/email.html.
Nielsen/Sessions Hardware, "Compression Spring Latches", www.casehardware.com/nielsencompres.html.
B&H Product Page, "Ikelite Housing Kit $3^{11}/_{16} \times 4.75 \times 7^{7}/_{8}$" deep", www02.bhphotovideo.com/defa.
Puch, Carlos, "Active Antenna", www.gpsnuts.com/myGPS/GPS/LEI%20tips%20tricks/Active%20 . . . /active_antenna2.html.
"An external antenna for the GPS–38, Magellan 2000, or Eagle Explorer", www.vancouver-webpages.com/peter/extant.txt.
Radioware & Radio Bookstore—Coax Loss Specifications, www.radiobooks.com/products/techinfo/coaxloss.htm.
Radioware & Radio Bookstore—RG–174 50 ohm Micro–Coax, www.radiobooks.com/products/rg174.htm.
Radioware & Radio Bookstore—Coax Applications, www.radiobooks.com/products/techinfo/coaxapps.htm.
Power–Sonic—An ISO 9002 Certified Corporation, "PS–1212 12 Volt 1.2 AMP.Hr.", www.power–sonic.com/1212.html.
ProtectionTech, "Sealed Lead Acid Battery Specifications", www.protectiontech.com/batery.htm.
"My Portable Sun", http://spiff.physics.mcgill.ca/scuba/light.html.
Trimble's Hardmount Antenna—Permanent mount GPS antenna designed for use with Lassen and Ace series of GPS receivers, www.dpie.com/gps/hardantenna.html.
BoatTECH Guides, Boat U.S. 2000, Boat Owners Association of the United States, "Antennas", www.boatus.com/boattech/antennas.htm.
Plastic Excess Inventory from American Acrylics, www.americanacrylics.com/excessplastic.shtm.

* cited by examiner

NAVIGATIONAL DEVICE FOR AN UNDERWATER DIVER

BACKGROUND OF INVENTION

The present invention relates generally to the field of underwater diving, and in particular to a method and apparatus, utilizing the Global Positioning System (GPS) to provide underwater divers with navigational information.

BACKGROUND—DISCUSSION OF PRIOR ART

In the field of underwater diving, it is sometimes difficult for a diver to accurately navigate between various locations or points of interest while submerged. One factor limiting a diver's ability to navigate with any degree of precession is poor visibility. Poor visibility can greatly reduce the ability of the diver to successfully descend from a dive boat or shore location and return confidently to the same location on their ascent. Furthermore, it can be very difficult for a diver to navigate between geographically separated underwater locations of interest when the diver's visibility of the locations is obscured.

The diver's currently recognized method of navigation involves the use of an underwater compass. This necessary underwater diver navigational tool, while greatly useful for indicating direction, can be of little use to a diver over great distances or after several directional changes in course. Small errors in directional travel can result in the diver being a large distance from the intended target location. While a diver can in some instances ascend to the surface to regain their directional baring, this in most cases can be extremely dangerous due to surface obstructions such as watercraft.

Another limiting factor to the success of a diver's navigation is time, which directly correlates to the diver's finite air supply. The more time that is spent navigating to and from various underwater locations, the more air that is used by the diver. While a diver's air use may vary greatly depending on various other factors, efficiently navigating between underwater locations will result in a diver using less air, thus enabling the diver to extend the quantity of bottom time spent at each underwater location.

Various devices have been designed attempting to overcome some of the navigational limitations listed above including U.S. Pat. No. 5,187,871 to McDermott (1993), which discloses an underwater navigation device incorporating a compass into a diver's facemask. As stated above, while the compass provides the diver with the ability to determine their heading, when used over large distances small navigational errors can result in large deviations from the desired course of travel and the desired destination.

Other prior art including U.S. Pat. Nos. 5,077,703 to Strauss (1991), 6,029,515 to Lahteenmaki (2000), 5,570,323 to Prichard (1996), 5,666,326 to Holzschuh (1997) provide for a method of underwater guidance based on a transmitter (s) that generate a signal, such as microwave or radio, to a receiver worn by the diver. Various methods are used to display to the diver the distance and direction from and to the transmitter. While this method will indicate the diver's approximate position relative to the transmitter, it will not provide a diver their location in relation to multiple reference points. Additionally, the cost and complexity of the various transmitters and receivers is prohibitive to most recreational divers.

Still another prior art reference U.S. Pat. No. 5,406,294 to Silvey (1995) describes a floating antenna system that is deployed and retrieved by an underwater diver. The Silvey invention is intended to be released by a submerged diver, floated to the surface for signal receiving, such as a GPS signal, and then retracted back to the diver when no longer needed. Although this patent provides for a method of using GPS signals to assist in underwater navigation, it is designed to be deployed after the diver is submerged, rather than allowing the diver to descend with the antenna deployed and active. It is also a legal and safety requirement in various jurisdictions for a diver to dive with a dive float and flag deployed at all times. The Silvey patent does not allow for this type of deployment.

Still other prior art references including U.S. Pat. Nos. 3,944,967 to Acks (1976) and 3,986,161 to MacKellar (1976) describe systems for underwater navigation utilizing ultrasonic transmitters and hydrophone receivers. While this method will indicate the diver's approximate position relative to the transmitter, it will not provide a diver their location in relation to multiple reference points without the addition of a transmitter for each additional reference point. Additionally, the cost and complexity of the various transmitters and receivers is prohibitive to most recreational divers.

Therefore, there is a need for a device and method for use by underwater divers to improve the accuracy of underwater navigation, while at the same time allowing for various legal and safety related diving requirements to be fulfilled.

SUMMARY OF THE INVENTION

In brief summary, the invention is intended to provide an underwater diver with a method and apparatus for accurately navigating between underwater locations including, to and from a dive boat or shore, or between waypoints plotted prior to the dive or entered in real-time, during the dive.

It is therefore an object of this invention to provide the underwater diver with a low-cost, lightweight, and easy to use apparatus with the ability to utilize Global Positioning System (GPS) location data, received by an antenna located on the surface of the water, and transmitted to a GPS receiver carried by the diver.

OBJECTS AND ADVANTAGES

Accordingly, several objects and advantages of my invention are as follows:

to provide the underwater diver with an apparatus to indicate their submerged dive location at the surface of the water with a dive flag and float.

to provide an underwater diver with a method and apparatus for accurately navigating to and from the starting location of a dive.

to provide a device that will float a Global Positioning System (GPS) antenna and power supply on the surface of the water.

to provide an underwater diver with a submergible GPS receiver and display.

to provide an apparatus which will dispense and retract varying lengths of tethering signal cable between a GPS antenna and a GPS receiver and display.

to provide an underwater diver the ability to plot a submerged objects location, as well as to allow the diver to return to the plotted location on subsequent dives.

to provide a GPS receiver capable of visually displaying to the underwater diver their current location at all times.

to provide to the underwater diver a GPS receiver capable of visually displaying the location of a plurality of plotted coordinates in relation to the diver's current location.

Further objects and advantages are to provide a method and apparatus for underwater diver navigation that are both portable and affordable to the recreational and professional underwater diver.

Still further objects and advantages will become apparent from a consideration of the ensuing description and drawings.

BRIEF DESCRIPTION OF DRAWINGS

Other objects, features, and advantages of the present invention will become more apparent from the following detailed description of the invention reviewed together with the following drawings in which.

DETAILED DESCRIPTION

List of Reference Numerals

20—Terrestrial Differential Global Positioning System (DGPS) Antenna 21—Global Positioning System Satellite 22—SCUBA Flag/Antenna Float 23—Signal/Umbilical Cable 24—GPS Capsule 25—Watertight Module Platform 26—Cable-reel/Antenna Cable 27—Watertight Module Platform Support Posts 28—GPS Antenna Power Supply Module 29—Cable-reel Enclosure 30—Spring Loaded Cable-reel 31—Dive Flag Staff 32—GPS Antenna 33—Underwater Diver 34—Watertight Module 35—Clear Watertight Module Lid 36—Inflatable Flotation Ring 37—Counter-weight Ring 38—SCUBA Dive Flag 39—RG-174 Coax Cable 40—Protective Plastic Ring 41—GPS Receiver/Display 42—Float Clip 43—GPS Capsule Cover Compression Latch 44—GPS Capsule Cover O-Ring 45—GPS Capsule Cover 46a—GPS Capsule Cover Pass-through Hole 46b—GPS Capsule Cover Pass-through 47—GPS Capsule Cover Compression Latch Hook 48—GPS Capsule Cover Pass-through O-Ring 49—GPS Capsule Cover Pass-through Compression Fitting 49a—GPS Capsule Cover Pass-through Compression Fitting Nut 49b—GPS Capsule Cover Pass-through Compression Fitting Nut 50—Underwater Diver Navigation Device 51—Bungee Cord 52—PVC Bolt 53—PVC Nut 54—PVC Washer 55—Rubber Cable Pass-through 56—Electronic Component Box 57—Nine-volt Battery 58—Circuit/Bread Board 59—On/Off Power Switch 60—Extended PVC Nut 61—Safety Cord 62—Counter-weight Pole Flange 63—Voltage Regulator 64—Blocking Inductor 65—Capacitor (0.33 uF) or (330 nF) 66—Bypass Capacitor (10 nF) or (0.01 uF) 67—Bypass Capacitor (1000 pF) or (1 nF) 68—Bypass Capacitor (22 pF) 69—Capacitor (47 pF) 70a—Female BNC Connector 70b—Female BNC Connector 70—Female SMB Connector 71a—Male BNC Connector 71b—Male BNC Connector 72—Handheld GPS Receiver SMB Adapter 73—RG-58 Cable Jumper 74—Solid Flotation Ring 75—GPS Capsule Harness 76—Nylon Webbing 77—Wire Clamp 78—Nylon D-Ring 79—Nylon Clamp 80—GPS Float-Recreational 81—Manual Cable Reel 82—Battery Connector 83—Float Counter-weight and Pole 84—GPS Receiver—Antenna Connector 85—Cable Stop 86—Solid Floatation Ring Base

DETAILED DESCRIPTION OF INVENTION

Figure 1:
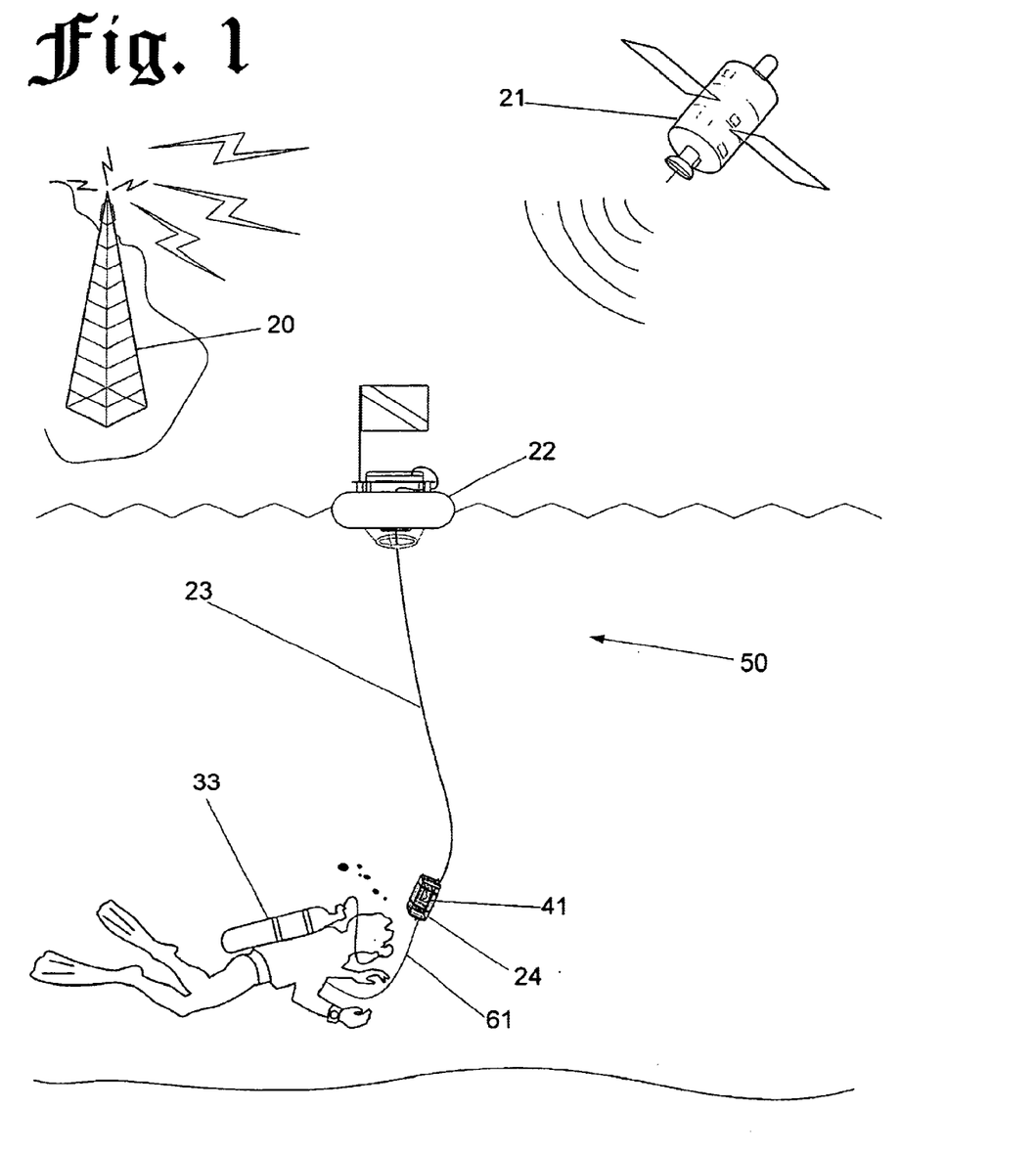
FIG. 1 is a perspective view of the underwater diver navigation device according to one embodiment of the present invention.

FIG. 1 is a perspective view of an Underwater Diver Navigation Device (50) according to one embodiment of the present invention. The Underwater Diver Navigation Device (50), or navigation device, comprises a SCUBA Flag/Antenna Float (22), or float, a Signal/Umbilical Cable (23), a GPS Capsule (24), and a GPS Receiver/Display (41).

Also depicted in FIG. 1 are a Global Positioning System Satellite (21), or GPS Satellite, and a Terrestrial Differential Global Positioning System (DGPS) Antenna (20), or DGPS Antenna, and a SCUBA Diver (33), who is represented as the potential end-user of the present invention.

The float is connected to the GPS Capsule (24) via the Signal/Umbilical Cable (23), or umbilical. The SCUBA Diver (33), or diver, is attached to the GPS Capsule (24) via a Safety Cord (61).

Figure 2:
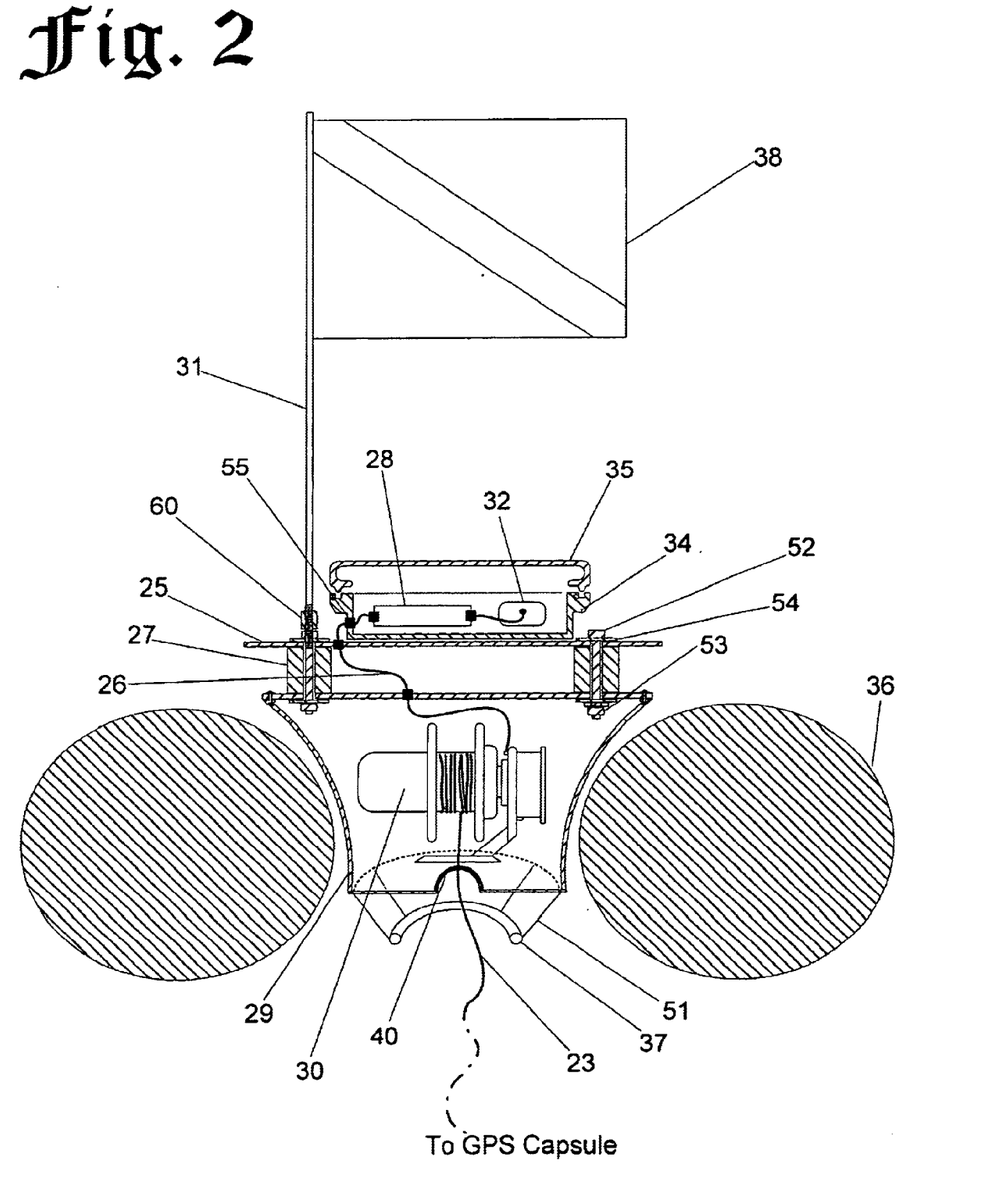
FIG. 2 is a cross-sectional view of the SCUBA Flag/Antenna Float component of the underwater diver navigation device, taken along line '2' of FIG. 3.

FIG. 2 is a cross-sectional view of the SCUBA Flag/Antenna Float (22) component of the Underwater Diver Navigation Device (50) of FIG. 1. The cross-section of FIG. 2 is taken along line '2' of FIG. 3. A Flotation ring (36) comprised of a standard radial car tire inner tube of sufficient buoyancy as to support the various components of the Underwater Diver Navigation Device (50) of FIG. 1, above the waterline. The size and required inflation of the inner tube is determined through either iterative analysis or the creation of a behavioral model incorporating the weight of the float, and drag of the GPS Capsule (24) and Signal/Umbilical Cable (23), of FIG. 1.

A Cable-reel Enclosure (29) is positioned in the Flotation ring's (36) 'donut hole'. The Cable-reel Enclosure (29), or enclosure, is also positioned to suspend the underside of the enclosure (29) a distance above the water line, as to minimize the amount of water entering the enclosure (29) due to waves or splashing water. The Cable-reel Enclosure (29) is composed of lightweight aluminum sheet metal, formed into an appropriate sized housing for enclosing a Spring Loaded Cable-reel (30), or Cable-reel. The Cable-reel Enclosure (29) has a bottom plate with a one-inch diameter round access hole located in the center, with a Protective Plastic Ring (40) positioned to minimize friction between the Cable-reel Enclosure (29) and the Signal/Umbilical Cable (23). One end of the Signal/Umbilical Cable (23), as well as a number of meters of additional cable (23), is coiled around the Cable-reel (30) and the opposite end of the umbilical (23) is fed through the access hole and attached to the GPS Capsule (24).

Attached to the bottom of the Cable-reel Enclosure (29) is a Counter-weight ring (37), or ring, connected via several lengths of a rubber Bungee Cord (51). The ring (37) is of appropriate weight as to maintain the position of the float (22) in a vertical attitude in rough waters.

The Spring Loaded Cable-reel (30) mounted to the floor of, and housed within, the Cable-reel Enclosure (29) may, for example, comprise commercially available equipment such as the IRC Coaxial-Cablereel manufactured by Industrial Radio Control, AB., of Mockfjard Sweden. The IRC Coaxial-Cable reel is an open cable-reel manufactured from press form steel, having a maximum cable length capacity of approximately 35 meters. A preferred embodiment of the Spring Loaded Cable-reel (30) features a spring-loaded, self-winding, non-ratcheting, cable-reel, which allows for smooth, self-tensioned, pay-out, and retraction of the Signal/Umbilical Cable (23).

A Watertight Module Platform (25) comprised of ½-inch Polyvinyl chloride (PVC) plastic sheet, of sufficient size as to support a Watertight Module (34) and a Clear Watertight Module Lid (35), is mounted to the top of the Cable-reel Enclosure (29) with a plurality of ½-inch PVC Bolts (52) secured with a plurality of PVC Nuts (53) and a plurality of PVC Washers (54). A Watertight Module Platform Support Post(s) (27), or post(s), are similarly comprised of Polyvinyl chloride (PVC) rod and separate the Watertight Module Platform (25) some distance from the Cable-reel Enclosure (29), and safely above the water line. The Clear Watertight Module Lid (35) is attached to the Watertight Module (34) by a hinge. The Watertight Module (34), and the Clear Watertight Module Lid (35), are attached to the Watertight Module Platform (25) with several strips of hook-and-loop fastener, for easy removal and maintenance. The Clear Watertight Module Lid (35) is transparent, thus causing no significant interference to the signal gathering capability of the GPS Antenna (32).

The Watertight Module (34) may, for example, be comprised of commercially available equipment such as the Otter Box, manufactured by Otter Products LLC, of Colorado. The Otter Box is housing comprised of fiberglass reinforced ABS resin housing and a clear acrylic lid separated by a closed cell neoprene o-ring, creating a watertight seal between the lid and the housing. A Rubber Cable Pass-through (55) is mounted in one side of the Watertight Module (34) allowing for a watertight seal between a Cable-reel/Antenna Cable (26) and the Watertight Module (34). The Watertight Module (34) houses a GPS Antenna (32) and a GPS Antenna Power Supply Module (28).

The GPS Antenna (32) may, for example, be comprised of commercially available equipment such as the TM200 Mighty Mouse II remote GPS Antenna manufactured by Tri-M Systems Inc., of British Columbia, Canada. The TM200 is a 28 dB gain, active, Global Positioning System (GPS) external antenna. The TM200 requires a maximum of 5 mA current, with an input range of 2.5 VDC to 5.5 VDC. The TM200 has a 3-stage amplifier and band pass filtering, a 40 to +85 degree Celsius operating range, and is fully waterproof.

A Dive Flag Staff (31), which may be composed of a 3-foot length of ½-inch PVC plastic rod, has one threaded end and is attached to the top of one of the PVC Bolts (52) with an Extended PVC Nut (60). Located and attached to the top of the Dive Flag Staff (31) is a regulation SCUBA Dive Flag (38). The SCUBA Dive Flag (38) may, for example, be comprised of a twelve by fourteen inch rectangle of common, water resistant vinyl material, having a red background with a diagonal white stripe, positioned from left to right, also comprised of water resistant vinyl material.

Figure 3:
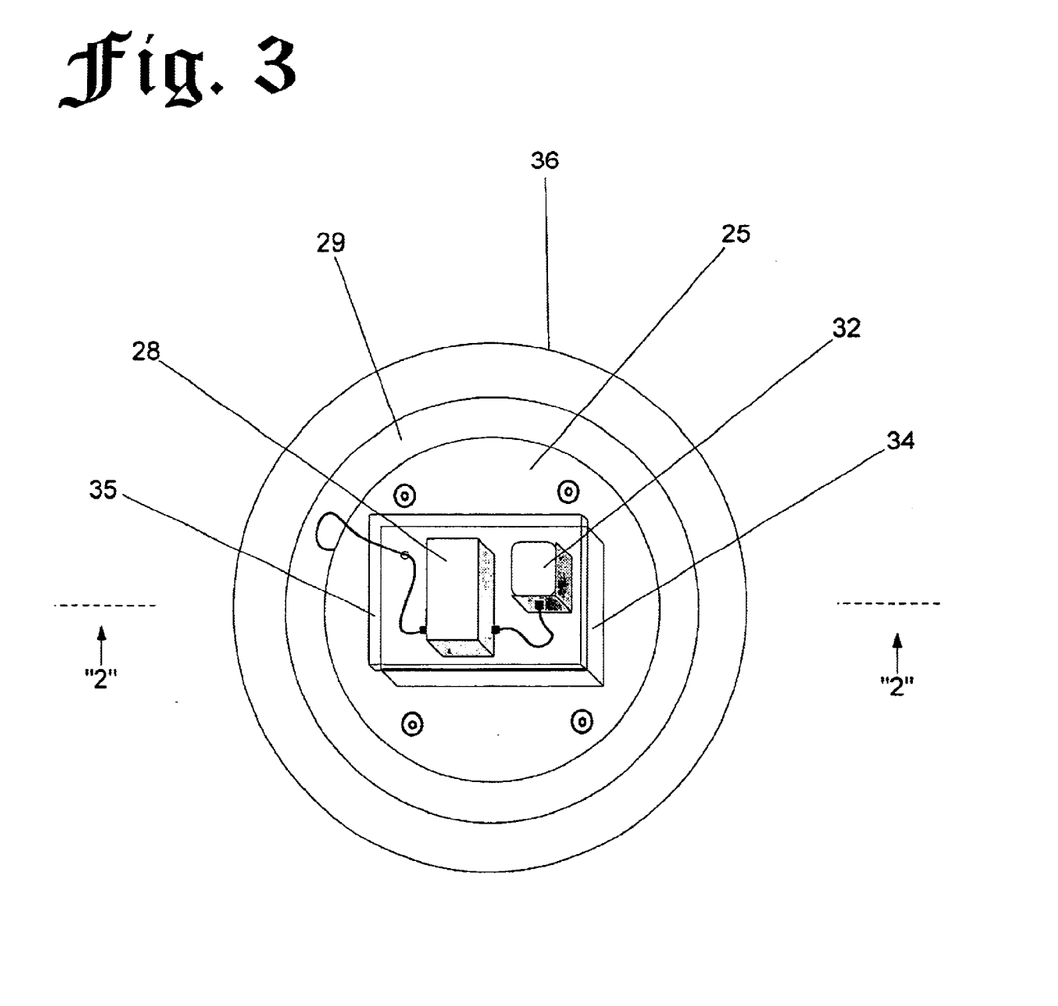
FIG. 3 is a top view of the SCUBA Flag/Antenna Float component of the underwater diver navigation device of FIG. 2.

FIG. 3 is a top view of the SCUBA Flag/Antenna Float (22) component of the Underwater Diver Navigation Device (50) of FIG. 1. Also shown in FIG. 3, are cross-section lines '2' indicating the cross-sectional line shown in FIG. 2.

Figure 4:
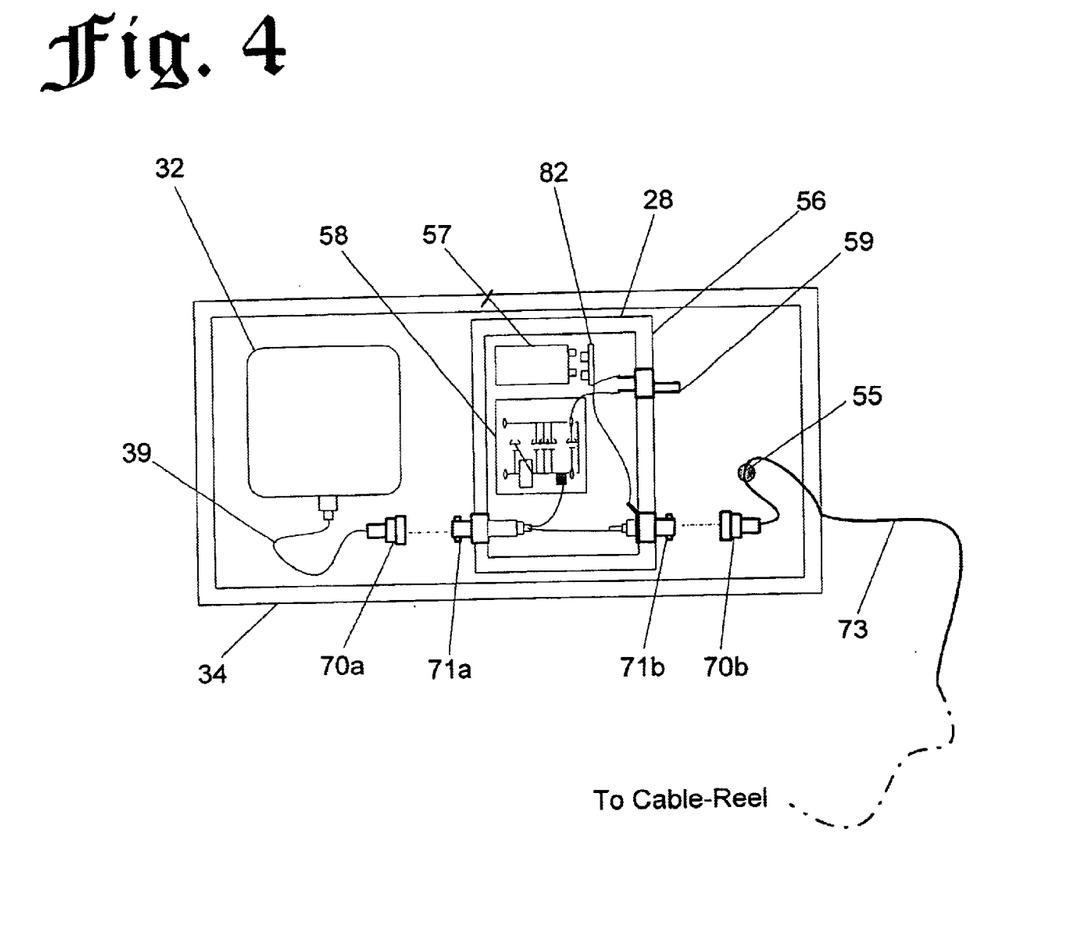
FIG. 4 is a top view of a preferred form of the Watertight Module of FIG. 2.

FIG. 4 is a top view of a preferred form of the Watertight Module (34) of FIG. 2. Also shown in FIG. 4 are the GPS Antenna (32) and a RG-174 Coaxial Cable (39), both of which are housed in the Watertight Module (34) to provide protection from the elements while in use.

The GPS Antenna Power Supply Module (28), or power supply, is also housed within the Watertight Module (34). The power supply (28) is comprised of an Electronic Component Box (56), a Nine-volt Battery (57), an On/Off Power Switch (59), and a Circuit/Bread Board (58) on which is mounted various electronic components connected in a way as to form an electrical circuit.

The GPS Antenna (32) has been described previously in the description for FIG. 2. The RG-174 Coaxial Cable (39) is used to connect the GPS Antenna (32) to the GPS Antenna Power Supply Module (28). The RG-174 Coaxial Cable (39) has an impedance of fifty Ohms, a maximum operating voltage of one thousand five hundred volts, and an outer diameter of one tenth of an inch. A waterproof PVC jacket surrounds the #26 stranded, copper-coated steel conductor, and eighty-eight percent tinned copper braid shield of the RG-174 Coaxial Cable (39).

The GPS Antenna (32) is active, and thus requires a maximum of 5 mA current, with an input range of 2.5 VDC to 5.5 VDC. Power is supplied to the GPS Antenna (32) via the RG-174 Coaxial Cable (39). The radio frequency signal, received from the GPS Antenna (32), is provided via the Signal/Umbilical Cable (23). The power supply (28) is comprised of a circuit configuration which is mounted on the Circuit/Bread Board (58), or Bread Board, using standard soldering techniques. The Bread Board (58) is mounted inside the GPS Antenna Power Supply Module (28).

Several criteria are met by the power supply (28), including the ability to provide five volts of regulated power from the unregulated battery voltage of the Nine-volt Battery (57). The power supply (28) must also provide a current limiter, to prevent overloading the electrical components in the event of a short circuit. The power supply (28) must also add five volts of antenna power to the receiving RG-174 Coax Cable (39) without loading the GPS signal that is also traveling on the same coaxial cable. Mounted on one side of the GPS Antenna Power Supply Module (28) is a Male BNC Connector (71a), which connects to a Female BNC Connector (70a) terminating the antenna's (32) RG-174 Coax Cable (39).

The power supply (28) must have the ability to pass the GPS signal from the receiving antenna (32) to the GPS Receiver/Display (41), of FIG. 1, while preventing the five-volt antenna (32) power from traveling to the GPS Receiver/Display (41), of FIG. 1, and overloading its circuits. Mounted in an opposite side of the GPS Antenna Power Supply Module (28) is a Male BNC Connector (71b) which connects to a Female BNC Connector (70b) which terminates a RG-58 Cable Jumper (73), comprised of a length of RG-58 Coaxial cable.

The On/Off Switch (59), mounted on a side of the Electronic Component Box (56), between the Nine-volt battery (57) and the electronic components, provides a way to turn off the supply of DC current. A Battery Connector (82) is used to connect the Nine-volt battery (57) to the On/Off Switch (59).

The RG-58 Cable Jumper (73) extends from the Watertight Module (34) via a Rubber Cable Pass-through (55)

mounted on the Watertight Module Lid (35) of FIG. 2. The opposite end of the RG-58 Cable Jumper (73) is connected to the Spring Loaded Cable-reel (30), of FIG. 2.

Figure 7:
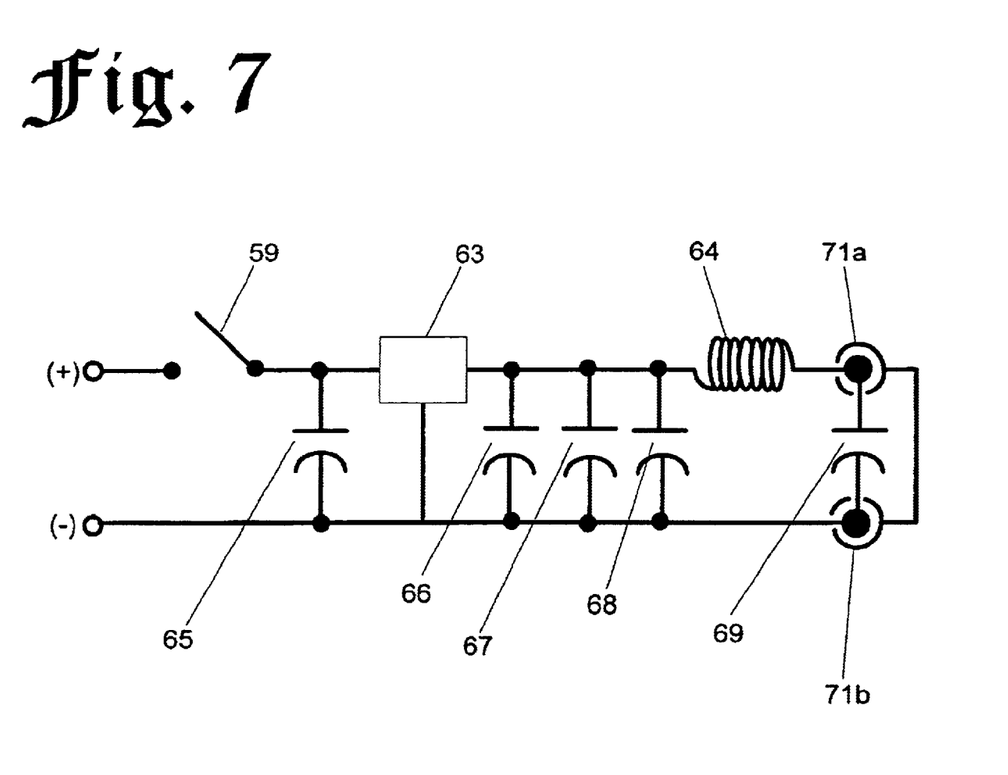
FIG. 7 is a circuit diagram of a preferred form of the GPS Antenna Power Supply electronics.

A detailed description of the electrical circuit and corresponding components is given in FIG. 7.

Figure 5:
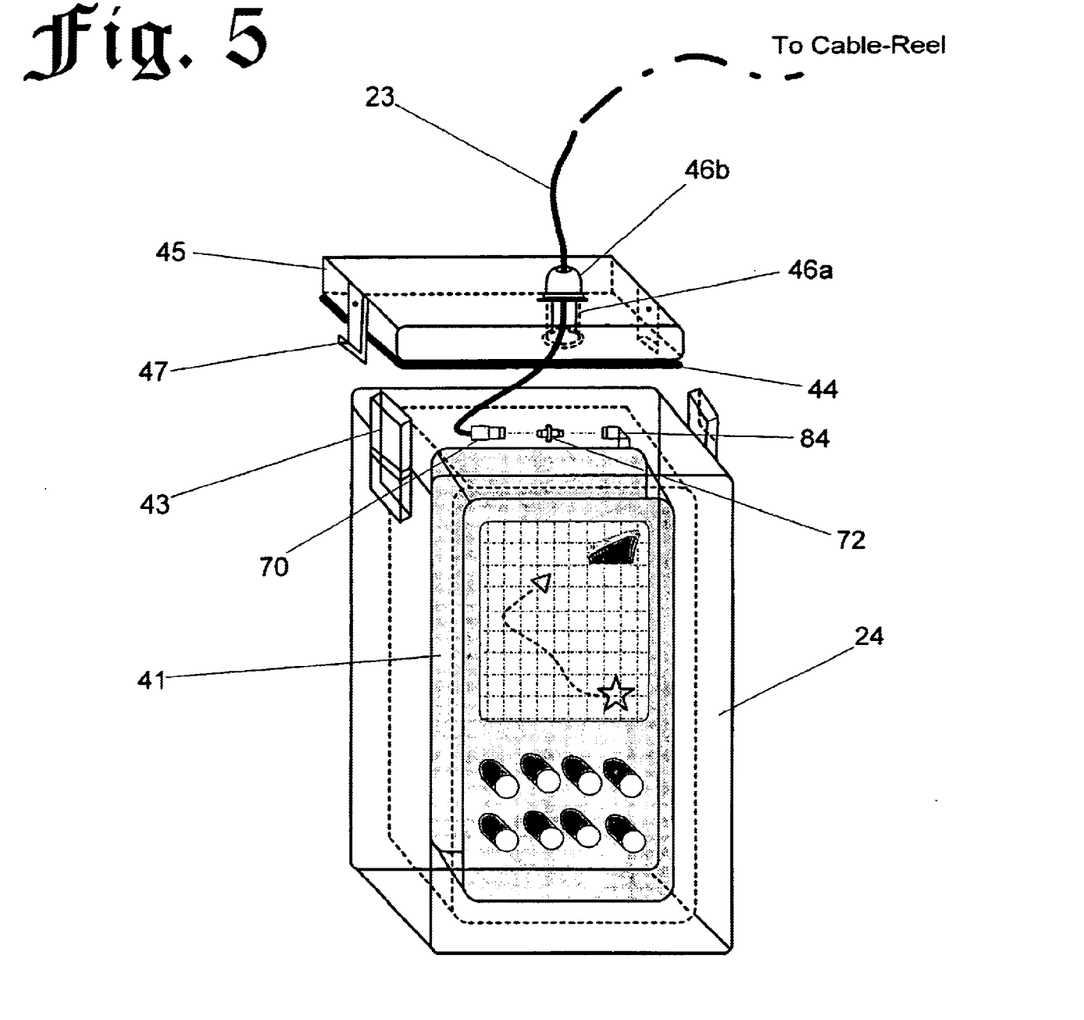
FIG. 5 is a perspective view of one embodiment of the GPS Receiver Capsule and Cover components of the underwater diver navigation device.

FIG. 5 is a perspective view of one embodiment of the GPS Capsule (24), or capsule, of FIG. 1. The GPS Capsule (24) is attached to a GPS Capsule Cover (45), or cover, by a series of GPS Capsule Compression Latches (43) that sandwich a GPS Capsule Cover O-Ring (44), or O-Ring, between the two, while compressing the O-Ring (44) to form a watertight seal. The GPS Capsule (24), the GPS Capsule Cover (45), and the GPS Capsule Cover O-Ring (44) may, for example, be comprised of commercially available equipment such as the Ikelite 4810 Housing Kit manufactured by Ikelite Underwater Systems Co., of Indianapolis, Ind.

The GPS Capsule Compression Latches (43), and a GPS Capsule Cover Compression Latch Hook(s) (47) may, for example, be comprised of commercially available equipment such as the 8341 Stainless Steel Catch & Strike manufactured by Guden of Ronkonkoma, N.Y. [0059] A GPS Capsule Cover Pass-through Hole (46a), allows the Signal/Umbilical Cable (23) of FIG. 1 to be run through the GPS Capsule Cover (45), and into the GPS Capsule (24). A GPS Capsule Cover Pass-through (46b) allows for a watertight seal between the Signal/Umbilical Cable (23) and the GPS Capsule Cover (45). A Female SMB Connector (70) terminates the end of the Signal/Umbilical Cable (23).

Also shown in FIG. 5 is the GPS Receiver/Display (41), or GPS Receiver. The GPS Receiver (41) is comprised of a handheld, off-the-shelf, Global Positioning System receiver. The GPS Receiver (41) may, for example, be comprised of commercially available equipment such as the GlobalMap 100, manufactured by Lowrance Electronics, Inc., of Tulsa, Okla. The GlobalMap 100 is a handheld, 12-Channel GPS receiver. The GlobalMap 100 has a built-in 160×104 pixel Liquid Crystal Display (LCD) for viewing plotted waypoints and computer downloaded waterway charts.

A Handheld GPS Receiver SMB Adapter (72), connects the Signal/Umbilical Cable (23) to the GPS Receiver/Display (41), via a GPS Receiver Antenna Connector (84), providing a signal interface between the two.

Figure 6:
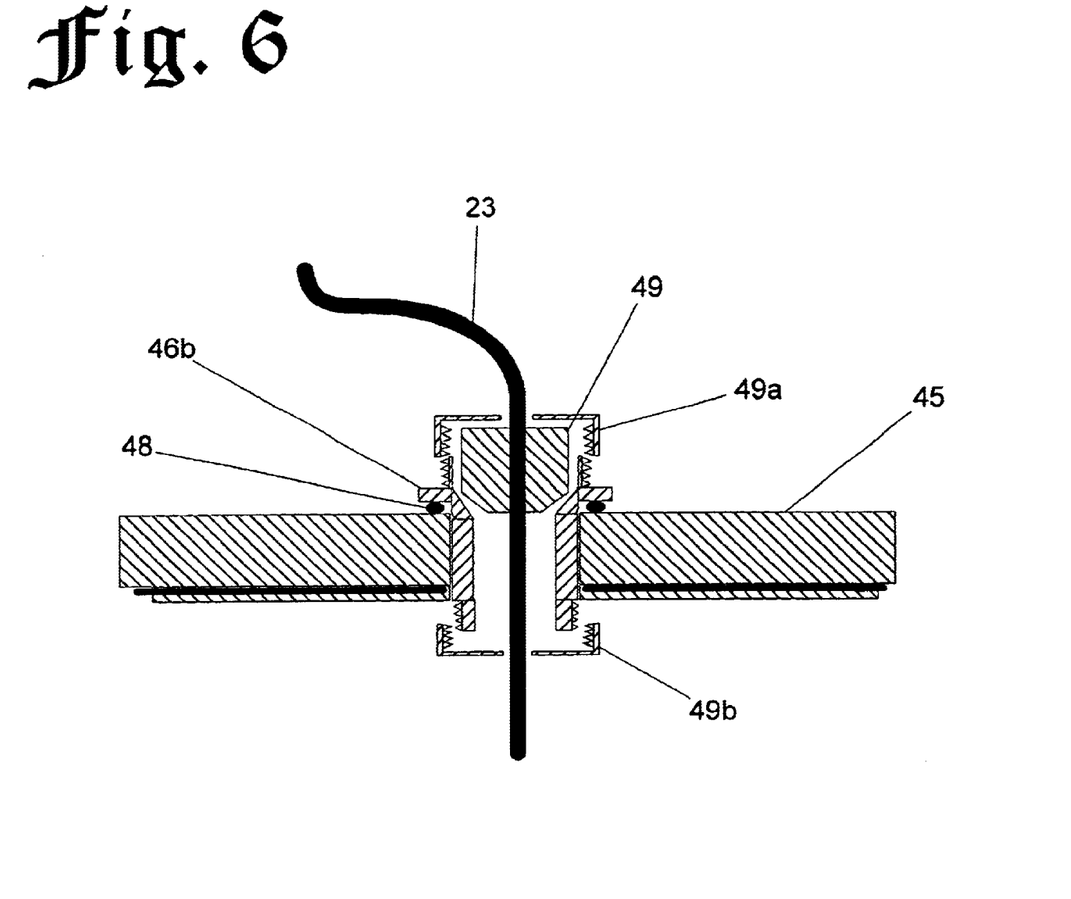
FIG. 6 is a cross-sectional view of the GPS Receiver Capsule Cover and Cable Pass-through of FIG. 5.

FIG. 6 is a cross-sectional view of the GPS Capsule Cover (45), or cover, and the GPS Capsule Cover Pass-through (46b), or pass-through of FIG. 5. The Pass-through (46b) provides a watertight seal at the location the Signal/Umbilical Cable (23) of FIG. 5 enters into the GPS Capsule (24), of FIG. 5 and may, for example, be comprised of commercially available equipment such as the Ikelite ICS 4006 Permanent Cord Connector, manufactured by Ikelite Underwater Systems Co., of Indianapolis, Ind. The Pass-through (46b) is a nickel-plated, brass, waterproof cable feed-through device that accepts cables of various diameters. The body of the Pass-through (46b) installs in a half-inch hole drilled into the GPS Capsule Cover (45), and is secured to the cover (45) using a GPS Capsule Cover Compression Fitting Nut (49b). A GPS Capsule Cover Pass-through O-Ring (48), and a GPS Capsule Cover Pass-through Compression Fitting (49), or fitting, are composed of neoprene material, providing a water tight seal between the GPS Capsule Cover (45), and the Signal/Umbilical Cable (23) once the fitting has been compressed by tightening a GPS Capsule Cover Compression Fitting Nut (49a) in a clockwise fashion.

FIG. 7 is a circuit diagram of one embodiment of the GPS Antenna Power Supply (28) electronics, of FIG. 4. A Voltage Regulator (63) has built-in current limiting and will shut down if exceeding a set temperature level. The Voltage Regulator's (63) maximum output current is approximately 300 mA.

A Blocking Inductor (64) is an inductor that passes DC from the Voltage Regulator (63), while also blocking the GPS signal from being loaded by the Voltage Regulator (63) and its various bypass capacitors. The Voltage Regulator (63) is made of six turns of #26 wire, wound in a coil, with a diameter of 3 mm. The turns are spread apart by about 1 wire diameter giving a total length of 6 mm.

The remaining components are capacitors. A ceramic Capacitor (0.33 uF) or (330 nF) (65) ensures the Voltage Regulator (63) remains stable. A ceramic Bypass Capacitor (10 nF) or (0.01 uF) (66), a ceramic Bypass Capacitor (1000 pF) or (1 nF) (67), and a ceramic Bypass Capacitor (22 pF) (68) filter out high frequency noise from the output of the Voltage Regulator (63), plus any RF that gets back through the Blocking Inductor (64).

A low-inductance, ceramic Capacitor (47 pF) (69) passes the GPS RF signal between the Male BNC Connector (71a), and a Male BNC Connector (71b).

All capacitors are standard mount with leads. A consistent 50-ohm impedance path is kept between the Male BNC Connector (71a) and the Male BNC Connector (71b) via a length of 50-ohm coax cable splicing the Capacitor (47 pF) (69) into the center conductors of the Male BNC Connector (71b) and the Male BNC Connector (71a).

The On/Off Power Switch (59) provides a way to turn off the supply of DC current to the circuit.

OPERATION OF INVENTION

Prior to using the Underwater Diver Navigation Device (50), several prerequisites must be satisfied. Depending on the underwater diver's (33) dive plan, one or more 'waypoints' or known geographical positions can be entered or marked using the GPS Receiver (41) prior to the dive. Before the diver (33) proceeds with the, prerequisite steps below, he/she may enter multiple waypoints, such as the current location of the dive boat, the location of the shore, or any other location that can help the diver (33) to navigate their dive plan successfully.

Once waypoints required by the diver (33) are entered into the GPS Receiver (41), the first prerequisite prior to using the Underwater Diver Navigation Device (50) is the attachment of the Nine-Volt Battery (57) to a Battery Connector (82). The GPS Receiver/Display (41) is then connected to the Female BNC Connector (70b). The diver (33) then moves the On/Off Power Switch (59), located on one side of the GPS Antenna Power Supply Module (28) into the 'on' position, thus supplying DC current to the GPS Antenna (32). The GPS Receiver/Display (41) is fitted with a fresh set of batteries and it is then powered on as well. The GPS Receiver/Display (41) is inserted into the GPS Capsule (24) and which is then sealed by closing the multiple GPS Capsule Cover Compression Latches (43). The Underwater Diver Navigation Device (50) is now ready to be deployed into a body of water for use.

The Underwater Diver Navigation Device (50) is used in a similar fashion as a standard SCUBA flag and float system used by most recreational and professional divers today. The SCUBA/Flag Antenna Float (22) is placed into the water at the start of a dive by the diver (33) and floats on the surface of the water due to the buoyancy provided by the Floatation Ring (36). The diver (33) enters the water with the GPS Capsule (24) attached to his/her buoyancy control device or BCD via the Safety Cord (61), which is in turn attached to the bottom of the GPS Capsule (24). As the diver (33) starts his/her decent, the additional Signal/Umbilical Cable (23) is released from the Spring Loaded Cable-reel (30). Once the diver (33) reaches the desired depth and begins to move in a lateral direction, tension between the Signal/Umbilical Cable (23) and the Spring Loaded Cable-reel (30) will cause the SCUBA/Flag Antenna Float (22) to follow the movement of the underwater diver (33) as it floats on the surface of the water.

When power was supplied to the GPS Antenna (32), and the GPS Receiver/Display (41) in the prerequisite steps listed above, the GPS Receiver/Display (41) will display an icon on the LCD display portion of the GPS Receiver/Display (41) representing the SCUBA/Flag Antenna Float's (22) approximate position. As the diver (33) proceeds on the dive, the icon will move in direct relation to the diver's (33) lateral movements underwater. The geographical position information indicated by the icon's position on the LCD Display allows the diver (33) to extrapolate his/her current position, either in relation to the previously entered waypoints, or in relation to a pre-loaded GPS Receiver (41) chart or map.

As the diver (33) proceeds on his/her dive a line is displayed on the LCD display portion of the GPS Receiver/Display (41) representing the tract of the diver's (33) movement in relation to previously entered waypoints, or a map of the underwater location, previously downloaded into the GPS Receiver/Display (41) and displayed in the background on the LCD Display portion of the GPS Receiver/Display (41). These tract lines allow the diver (33) to cover an area utilizing a grid layout, or retrace the path previously traveled, as well as indicate to the diver (33) his/her current location.

When the dive has completed, the diver (33) will determine where they want to ascend to the surface, be it back to the point of water entry or another previously determined waypoint. The diver (33) will then utilize the same process used to navigate to their current location to navigate to the assent location, utilizing the information displayed on the GPS Receiver/Display. Once at the assent location, the diver (33) would ascend allowing the Spring Loaded Cable-reel (30) to retract any slack in the Signal/Umbilical Cable (23). At the surface, the diver (33) would then exit the water and retrieve the Underwater Diver Navigation Device (50) in the best-suited manner for the occasion.

DESCRIPTION OF ALTERNATIVE EMBODIMENTS

Several variations on the Underwater Diver Navigation Device (50) are easily realized.

One alternate embodiment adds an antenna allowing for the reception of Differential Global Positioning System (DGPS) signals from a Terrestrial Differential Global Positioning System Antenna(s) (20) located on shore. DGPS signals provide the ability to calculate even more accurate positional coordinates than is possible with GPS signals alone.

Another alternative embodiment of the Underwater Diver Navigation Device (50) incorporates the GPS Receiver/Display (41) into a water and pressure proof umbilical package, similar to the size and convenience of the standard depth/pressure/computer gauge set commonly attached to the first-stage of a recreational diver's (33) regulator.

Still another alternative embodiment of the Underwater Diver Navigation Device (50) provides for a keypad on the face of the GPS Capsule (24) allowing the diver (33) to enter waypoints directly into the GPS Receiver/Display (41) while submerged, as well as utilize the full functionality of the GPS Receiver/Display (41) while submerged.

Still another alternative embodiment eliminates 'automatic' Signal/Umbilical Cable (23) management by eliminating the Spring Loaded Cable-reel (30), and provides for manual release of the Signal/Umbilical Cable (23) during the diver's (33) decent. This greatly reduces the size and weight of the SCUBA Flag/Antenna float (22), providing for an overall smaller, lighter, and easier to manage Underwater Diver Navigation Device (50).

Figure 8:
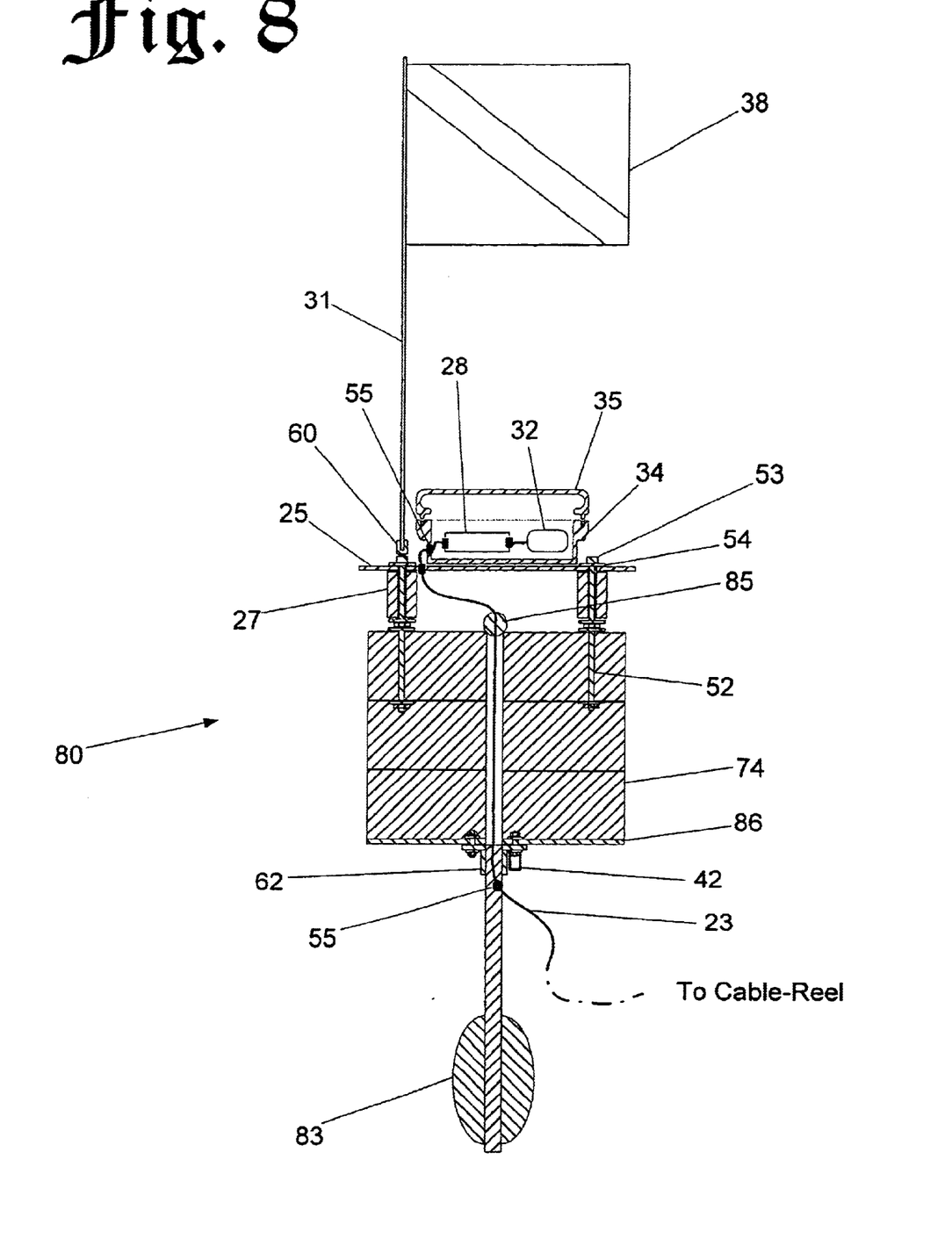
FIG. 8 is a perspective view of the underwater diver navigation device according to a second embodiment of the present invention.

FIG. 8 is a cross-sectional view of an alternative embodiment of the Underwater Diver Navigation Device (50), of FIG. 1, also taken along line '2' of FIG. 3. A GPS Float-Recreational (80) is supported by a Solid Flotation ring (74) comprised of several layers of closed-cell, cross-linked, polyethylene foam material. The Solid Flotation ring (74) is of sufficient buoyancy as to support the Watertight Module Platform (25), and the Watertight Module (34) above the waterline. In this alternative embodiment the Inflatable Floatation Ring (36) of FIG. 2, is replaced with the Solid Flotation ring (74) of FIG. 8. The Cable-reel Enclosure (29), of FIG. 2 has been removed and in this embodiment the Signal/Umbilical Cable (23) is fed through a hole running vertically through the Solid Floatation Ring (74).

A Cable Stop (85) is positioned above the vertical hole in the Solid Floatation Ring (74), to prevent a slack amount of Signal/Umbilical Cable (23) from being pulled past the Cable Stop (85).

At the bottom of the Solid Floatation Ring (74) is a Solid Floatation Ring Base (86). A Counter-weight Pole Flange (62) connects a Float Counter-weight and Pole (83), or counter-weight. The counter-weight (83) is comprised of a lead sinker of appropriate weight as to position the float in a vertical attitude in rough water. The Signal/Umbilical Cable (23) is fed through a hole in the pole portion of the Float Counter-weight and Pole (83) which is fitted with the Rubber Cable Pass-through (55).

The Watertight Module Platform (25), comprised of Polyvinyl chloride (PVC) plastic sheet, is mounted to the top of the Solid Floatation Ring (74) with the four PVC Bolts (52) and is secured with the four corresponding PVC nuts (53) and the eight PVC Washers (54). The PVC Bolts (52) are run through the Watertight Module Platform (25) and one layer of the Solid Flotation ring (74) foam. The Watertight Module Platform Support Posts (27), or posts, are similarly comprised of Polyvinyl chloride (PVC) rod and separate the Watertight Module Platform (25) some distance from the Solid Floatation Ring (74) and safely above the water line. The Watertight Module (34) is attached to the Watertight Module Platform (25) with several strips of hook-and-loop fastener.

The GPS Antenna (32) is identical to the description given for the GPS Antenna (32), of FIG. 2.

The GPS Antenna Power Supply Module (28) is identical to the description given for GPS Antenna Power Supply Module (28), of FIG. 2. [0086] The SCUBA Dive Flag (38), and Dive Flag Staff (31), are also identical to the description in FIG. 2.

Figure 9:
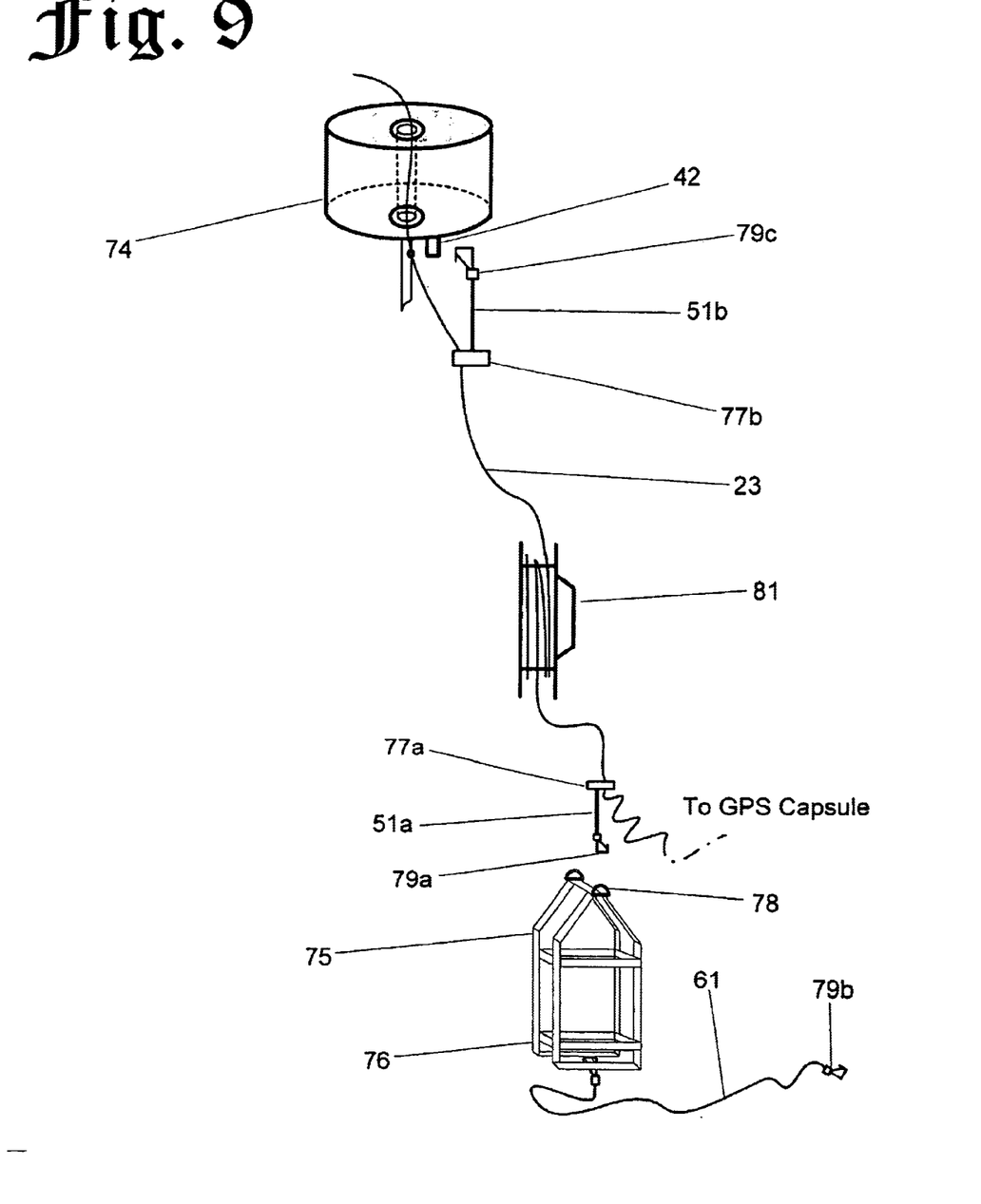
FIG. 9 is a perspective view of the underwater diver navigation device's GPS Receiver Capsule harness system according to the second embodiment of the present invention.

FIG. 9 is a perspective view of a GPS Capsule harness (75) system for the Underwater Diver Navigation Device (50) according to another embodiment of the present invention. The GPS Capsule Harness (75), or harness, is comprised of commercially available Nylon Webbing (76), sewn into a harness supporting the GPS Capsule (24), of FIG. 5.

The Nylon Webbing (76) has a Nylon D-Ring(s) (78) sewn into each side of the harness (75), and is attached via a Nylon Clamp (79a) to a length of Bungee Cord (51a). A Wire Clamp (77a) is attached to the opposite end of the length of Bungee Cord (51a) and is also attached to the Signal/Umbilical Cable (23). A Safety Cord (61) is attached to the bottom of the GPS Capsule Harness (75); the opposite end of the Safety Cord (61) is attached to the underwater diver (33), via a Nylon Clamp (79b).

A number of meters of additional Signal/Umbilical Cable (23) is coiled around a Manual Cable-reel (81) to be manually deployed by the diver (33) during decent, and manually re-coiled by the diver (33) during assent.

The Float Clip (42) is attached to the bottom of the Solid Floatation Ring (74). Attached to the Float Clip (42) is a Nylon Clamp (79c), which is attached via a length of Bungee Cord (51b) to a Wire Clamp (77b). The opposite end of the length of Bungee Cord (51b) is attached to the Signal/Umbilical Cable (23).

OPERATION OF ALTERNATIVE EMBODIMENTS

The alternative embodiment of the Underwater Diver Navigation Device (50) is also used in a similar fashion as a standard diver's flag and float system used by most recreational and professional divers. The SCUBA/Flag Antenna Float (22) is placed into the water at the start of a dive by the diver (33) and floats on the surface of the water due to the buoyancy provided by the Solid Floatation Ring (74). The diver (33) enters the water with the GPS Capsule (24) attached to his/her buoyancy control device or BCD via the Safety Cord (61), which is in turn attached to the bottom of the GPS Capsule (24). As the diver (33) starts his/her decent, the additional Signal/Umbilical Cable (23) is manually unwound from the Manual Cable-reel (81) by the diver (33) until the required length of signal cable is deployed. Once the diver (33) reaches the desired depth and begins to move in a lateral direction, tension between the SCUBA/Flag Antenna Float (22) and the GPS Capsule (24) will cause the SCUBA/Flag Antenna Float (22) to follow the movement of the diver (33) as it floats on the surface of the water. Underwater navigation is consistent with the previously described preferred embodiment.

It is to be understood that the present invention is by no means limited to the particular constructions herein disclosed and/or shown in the drawings, but comprises any modifications or equivalents within the scope of the claims.

CONCLUSION, RAMIFICATIONS & SCOPE OF INVENTION

Thus the reader will see that the Underwater Diver Navigation Device of this invention allows Global Positioning System (GPS) coordinates to be made accessible to the diver for use in underwater navigation. In addition, the SCUBA Flag/Float of this invention visibly marks the location of the underwater diver to surface boats. Furthermore the underwater navigation device has additional advantages in that it is lightweight and transportable to various diving locations.

It does not require the use of large costly SONAR, ultrasonic, or radio wave transmitting/receiving equipment.

It allows the underwater diver the ability to mark various waypoints while submerged.

It does not require multiple surface buoys to determine the divers position.

It is affordable to most recreational divers.

It is easy to use and unobtrusive to underwater dive operations.

Although the description above contains many specificities, these should not be construed as limiting the scope of the invention, but as merely providing illustrations of some of the presently preferred embodiments of this invention. Many variations are possible.

For example the SCUBA Flag/Float can be made of differing buoyant materials of varying colors, the GPS Capsule as well as the GPS Receiver/Display can be made smaller and more compact. The GPS Capsule and GPS Receiver/Display can be incorporated into a single self-contained water and pressure proof unit. The GPS Capsule and GPS Receiver/Display can be incorporated into an integrated SCUBA first-stage umbilical gauge set. The Signal/Umbilical Cable can be made of varying lengths and diameters.

Accordingly, the scope of the invention should be determined not by the embodiment(s) illustrated, but by the appended claims and their legal equivalents.

What is claimed is:

1. A navigational device for providing a diver access to global positioning system position information, said navigational device comprising:
   a. a flotation device having sufficient positive buoyancy to support said navigational device above a water surface
   b. a watertight capsule with transparent window for encasing a gps receiver
   c. a waterproof signal conducting cable for tethering said floatation device to said watertight capsule such that said cable is adapted to extend generally vertically in a column of water between said floatation device and said watertight capsule.

2. A navigational device, as described in claim 1, wherein said floatation device comprises:
   a. a floatation device of positive buoyancy so as to support said navigational device above said water surface
   b. a watertight module for housing a radio signal antenna
   c. said watertight module also housing a power supply
   d. a platform for supporting said watertight module a distance above said floatation device
   e. means for attaching said platform to said floatation device
   f. means for attaching said platform to said watertight module while maintaining the watertight nature of said module
   g. a ballast located so as to stabilize said navigational device in an upright position while deployed on said water surface
   h. an enclosure for housing a length of said waterproof signal conducting cable
   i. said floatation device having an orifice in said cable enclosure whereby lengths of said waterproof cable can be released and retracted through said orifice, and
   j. a means for connecting said floatation device to one end of said signal cable and said watertight capsule to the distal end of said signal cable.

3. Said floatation device of claim 2 having a cable-reel for maintaining organization of said waterproof signal cable enclosed in said cable enclosure, said cable-reel comprising:
   a. a spool in which said signal cable is wound and un-wound when said cable is released and retracted from a body of water b. said spool having means as to provide self-winding capability c. said spool having means as to provide constant and consistent minimal tension on said cable during decent and assent, as to maintain the least amount of slack between said floatation device and said watertight capsule d. said cable-reel of sufficient capacity as to support cable lengths of over 40 meters e. means of attaching said cable-reel to said cable enclosure f. means of attaching said signal cable to said cable-reel.

4. A navigational device as described in claim 1, wherein said watertight capsule comprises:

a. a watertight plastic capsule including a body having one closed end and one open end, and a lid for sealing said open end b. an o-ring positioned between said capsule's open end and said lid for forming a watertight seal between said capsule and said lid c. a plurality of watertight spring-loaded latches for compressing said o-ring between said capsule and said lid for creating a watertight seal d. a watertight cable pass-through for inserting said waterproof cable into said watertight capsule, said cable pass-through having means of insuring the watertight seal of the capsule e. a plurality of user interface buttons allowing the diver to interface with said gps receiver while submerged f. a magnifying optical lens integrated in a sector of said watertight capsule for enhanced viewing of a gps receiver display.

5. The navigational device of claim 4, wherein said gps receiver is a global positioning system signal processor for determining where on the surface of the earth the navigational device is located.

6. A navigational device as described in claim 5, where said gps receiver comprises:

a. a global positioning system receiver having means to utilize wide area augmentation system, and differential global positioning system data b. a means for attaching said antenna to said gps receiver while maintaining signal continuity c. an internal renewable power source d. a plurality of user interface buttons allowing said diver to input data into the gps receiver e. a watertight housing having a display face f. said display face having means for visually indicating the current location of said gps receiver g. said gps receiver having means for graphically displaying in real-time the geographic position of said gps receiver on the earth's surface h. said gps receiver having means for illuminating said display face for enhanced viewing by a diver at night or during low visibility i. said gps receiver having means for graphically displaying a plurality of position indicating elements on said display face.

7. A navigational device, as described in claim 1, wherein said signal conducting cable comprises:

a. a signal conducting cable in signal conducting relationship with said antenna and said gps receiver b. said signal cable being capable of transmitting radio frequency signals c. a length of said signal carrying cable d. said signal cable having means of electrically carrying the gps signal acquired and transmitted by said antenna e. said signal cable having an impedance of approximately 50 ohms f. said signal cable having a waterproof outer coating g. said signal cable having a distal end opposite from said antenna, further comprising said watertight capsule attached to said distal end for transmitting and receiving signals.

8. A navigational device, as described in claim 2, wherein said watertight module comprises:

a. a radio signal receiving antenna b. an electrical circuit means within said housing, providing a power supply for said active antenna c. a power source d. said power source comprising a battery operatively connected to a on/off switch for energizing and de-energizing said circuit means e. said watertight module having a space of sufficient size to house said antenna f. said watertight module having a space of sufficient size to also house said power source g. said watertight module having a transparent lid as to allow un-hindered radio signal reception by said gps antenna h. said watertight module having means to secure said transparent lid to said case i. said watertight module having means as to secure said housing and said lid in a fashion as no water is allowed to enter.

9. The navigational device of claim 2 wherein said antenna is a receiver responsive to signals generated by global positioning system satellites.

10. A navigational device, as described in claim 8, wherein said electrical circuit includes:

a. a means for regulating voltage b. a means for blocking said gps signal from said power source c. a means for filtering high frequency noise d. a means of filtering radio frequency noise e. a means for maintaining a consistent approximately 50-ohm impedance path.

11. A navigational device for providing global positioning system location information to an underwater diver, said navigational device comprising:

a. a flotation device having sufficient positive buoyancy to float on a water surface while supporting said navigational device b. a watertight capsule with transparent window, for encasing a gps receiver to protect said gps receiver from water and pressure damage c. a signal conducting cable for tethering said floatation device to said watertight capsule such that said cable is adapted to extend generally vertically in a column of water between said floatation device and said watertight capsule d. a watertight cable pass-through for connecting said cable to said watertight capsule e. a plurality of user interface buttons integrated in a sector of said watertight capsule for allowing the diver to interface with said gps receiver while submerged f. a magnifying optical lens integrated in a portion of said watertight capsule for enhanced viewing of said gps receiver display.

12. A navigational device, as described in claim 11, wherein said floatation device comprises:
   a. a floatation ring of positive buoyancy so as to support said navigational device above said water surface
   b. a watertight module for encasing an antenna
   c. said watertight module also encasing a power supply
   d. a platform for supporting said watertight module a distance above said floatation device
   e. means for attaching said platform to said flotation device
   f. means for attaching said watertight module to said platform while maintaining the watertight nature of said module
   g. a ballast located so as to stabilize said navigational device in an upright position while deployed on a water surface
   h. a means for connecting said floatation device to one end of said signal cable and said watertight capsule to the distal end of said signal cable.

13. The navigational device of claim 11, wherein said gps receiver is a global positioning system signal processor for determining where on the surface of the earth the navigational device is located.

14. The navigational device as described in claim 13, where said gps receiver comprises:
   a. a global positioning system receiver having means to utilize wide area augmentation system, and differential global positioning system data
   b. a means for attaching said antenna
   c. an internal rechargeable power source
   d. a plurality of user interface buttons allowing said diver to input data into the gps receiver
   e. a watertight housing having a display face
   f. said display face having means for visually indicating the current location of said gps receiver
   g. a means for graphically displaying on said display face, the geographic movement of said gps receiver
   h. a means for illuminating said display face for enhanced viewing by a diver at night or during low visibility
   i. means for graphically displaying a plurality of position indicating elements on said display face.

15. A navigational device, as described in claim 11, wherein said signal conducting cable comprises:
   a. a signal carrying cable of some length
   b. said signal conducting cable in signal conducting relationship with said antenna and said gps receiver
   c. said signal cable having means of transmitting radio frequency signals
   d. said signal cable having means of electrically carrying the gps radio signal
   e. said signal cable having an impedance of approximately 50 ohms
   f. said signal cable having a waterproof outer coating
   g. said signal cable having a distal end opposite from said antenna, further comprising said watertight capsule attached to said distal end for housing said gps receiver.

16. a navigational device, as described in claim 12, wherein said watertight module comprises:
   a. a radio signal antenna capable of receiving wide area augmentation system and differential global positioning system signals
   b. a electrical circuit means
   c. a power source
   d. said power source comprising a batter operatively connected to an on/off switch for energizing and de-energizing said circuit means
   e. said watertight module being of sufficient size as to house said power supply and said antenna
   f. said watertight module having a transparent lid as to permit said antenna unhampered access to gps satellite signals
   g. said watertight module having means to secure said transparent lid to said case in a fashion which maintains a watertight seal between said lid and said case.

17. A navigational device, as described in claim 16, wherein said electrical circuit includes:
   a. a means for regulating voltage
   b. a means for blocking said gps signal from said power source
   c. a means for filtering high frequency noise
   d. a means of filtering radio frequency noise
   e. a means for maintaining a consistent approximately 50-ohm impedance path between said antenna and said gps receiver.

18. A navigational device for providing a diver access to global positioning system, position information comprising:
   a GPS antenna;
   a floatation device for supporting said antenna above the water surface, said floatation device supporting an antenna power supply;
   a GPS receiver disposed in a watertight housing; and
   a signal conducting cable operatively connecting said GPS receiver to said floatation device.

19. A navigational device as defined in claim 18 further including a cable-reel, connected to said flotation device for dispensing a length of said signal conducting cable.

20. A navigational device as defined in claim 18, wherein said floatation device includes a watertight module for encasing said antenna and said power supply.

21. A navigational device for providing global positioning system location information to an underwater diver, said navigational device comprising:
   a) a flotation device having sufficient positive buoyancy to float on a water surface while supporting said navigational device, said flotation device includes;
      1) a floatation ring of positive buoyancy for supporting said navigational device above the water surface,
      2) a watertight module casing a radio signal antenna and a power supply, said power supply connected to an on/off switch, said watertight module having a transparent lid to permit said antenna access to gps satellite signals, said lid being secured to said case in a watertight manner, said watertight module including an electrical circuit having a means for regulating voltage, a means for blocking said gps signal from said power source, a means for filtering high frequency noise, a means of filtering radio frequency noise, and a means for maintaining a consistent approximately 50-ohm impedance path between said antenna and said gps receiver,
      3) a platform for supporting said watertight module a distance above said floatation device 4) means for attaching said platform to said flotation device
5) means for attaching said watertight module to said platform while maintaining the watertight nature of said module,
6) a ballast located so as to stabilize said navigational device in an upright position while deployed on a water surface;

b) a watertight capsule with transparent window for encasing a gps receiver; and c) a signal conducting cable for tethering said floatation device to said watertight capsule such that said cable is adapted to extend generally vertically in a column of water between said floatation device and said watertight capsule, said floatation device further including means for connecting said floatation device to one end of said signal cable and said watertight capsule to the distal end of said signal cable.

* * * * *